(12) United States Patent
Iacaruso et al.

(10) Patent No.: US 12,195,288 B2
(45) Date of Patent: Jan. 14, 2025

(54) EQUIPMENT AND PROCESS FOR THE LOGISTICS OF SLAB-SHAPED ARTICLES

(71) Applicant: LK LAB S.R.L., Fiorano Modenese (IT)

(72) Inventors: Luca Iacaruso, Fiorano Modenese (IT); Michele Iacaruso, Fiorano Modenese (IT)

(73) Assignee: LK LAB S.R.L., Fiorano Modenese (IT)

( * ) Notice: Subject to any disclaimer, the term of this patent is extended or adjusted under 35 U.S.C. 154(b) by 369 days.

(21) Appl. No.: 17/615,862

(22) PCT Filed: Jun. 18, 2020

(86) PCT No.: PCT/IB2020/055694
§ 371 (c)(1),
(2) Date: Dec. 2, 2021

(87) PCT Pub. No.: WO2020/255006
PCT Pub. Date: Dec. 24, 2020

(65) Prior Publication Data
US 2022/0306403 A1    Sep. 29, 2022

(30) Foreign Application Priority Data

Jun. 19, 2019  (IT) .......................... 102019000009540
Dec. 17, 2019  (IT) .......................... 102019000024352

(51) Int. Cl.
*B65G 47/91*   (2006.01)
*B65G 49/06*   (2006.01)

(52) U.S. Cl.
CPC ......... *B65G 47/914* (2013.01); *B65G 47/917* (2013.01); *B65G 47/918* (2013.01);
(Continued)

(58) Field of Classification Search
CPC ....... B25J 5/02; B25J 9/0093; G05B 19/4182; B65G 47/914; B65G 47/918; B65G 2201/022
See application file for complete search history.

(56) References Cited

U.S. PATENT DOCUMENTS

| | | | | |
|---|---|---|---|---|
| 4,863,340 A | * | 9/1989 | Masunaga ............ | B65G 49/068 271/106 |
| 6,059,092 A | * | 5/2000 | Jerue ..................... | B65G 1/1373 198/364 |
| 2015/0274420 A1 | * | 10/2015 | Krommer ............ | B65G 49/067 414/807 |

FOREIGN PATENT DOCUMENTS

| BE | 1021448 B1 | * | 11/2015 | |
|---|---|---|---|---|
| DE | 19945338 A1 | * | 4/2001 | ........... B65G 49/068 |

(Continued)

*Primary Examiner* — Gerald McClain
(74) *Attorney, Agent, or Firm* — ASLAN LAW, P.C.

(57) ABSTRACT

Equipment for the logistics of slab-shaped articles comprises supply line(s) of slab-shaped article(s) and outlet line(s) of the slab-shaped article(s); robotic gripping assembly(s) of the slab-shaped article(s) provided with at least three degrees of freedom and positioned between the supply line(s) and the outlet line(s); first movement device/unit/component/etc. of the gripping assembly(s) along a direction(s) of movement; where the supply line(s) and said outlet line(s) are substantially aligned to each other along the direction(s) of movement. Equipment also comprises temporary storage stations of the slab-shaped article(s) arranged laterally to the gripping assembly and substantially aligned to each other to define at least one row substantially parallel to the direction of movement, wherein the gripping assembly(s) picks the slab-shaped article(s) coining from the supply line(s); positions the slab-shaped article(s) on the storage station(s); and picks the slab-shaped article(s) from the storage station(s) and bring it to the outlet line(s).

13 Claims, 11 Drawing Sheets

(52) U.S. Cl.
CPC ...... *B65G 49/067* (2013.01); *B65G 2201/022* (2013.01); *B65G 2249/04* (2013.01)

(56) References Cited

FOREIGN PATENT DOCUMENTS

| | | |
|---|---|---|
| EP | 2 694 408 A1 | 2/2014 |
| WO | WO 2012136683 A1 | 10/2012 |
| WO | WO-2018229591 A1 * | 12/2018 .......... B25J 15/0052 |

* cited by examiner

EQUIPMENT AND PROCESS FOR THE LOGISTICS OF SLAB-SHAPED ARTICLES

CROSS-REFERENCE TO RELATED APPLICATIONS

This application claims priority to IT patent application No. 102019000009540 filed on Jun. 19, 2019 and to IT patent application No. 102019000024352 filed on Dec. 17, 2019 and, and this application claims priority to and is a 371 of international PCT Application No. PCT/IB2020/055694 filed on Jun. 18, 2020, the entire contents of which are hereby incorporated by reference.

TECHNICAL FIELD

The present invention relates to a piece of equipment and a process for the logistics of slab-shaped articles.

BACKGROUND ART

A slab-shaped article is a product obtained as a result of an industrial process and, specifically, is a large-sized slab.

At the end of the production process, the slab-shaped articles are generally moved in such a way as to send them to further processing phases, such as e.g. grinding, or to storage areas awaiting packaging for marketing.

During the storage phase, the slab-shaped articles are placed on appropriate frames, which may be horizontal or vertical depending on the position taken by the articles themselves, and are then moved individually or in a block together with the relevant frame.

The movement of the slab-shaped articles is generally carried out by means of appropriate equipment, e.g. of the suction cup type, which can be operated manually or automatically.

Given the often very bulky dimensions of the slab-shaped articles, it is easy to understand how their movement is particularly delicate, so the further away the storage areas are, the greater the risk of breakage during the journey to reach them.

In order to overcome this drawback, the slab-shaped articles are often moved together with the relevant frame.

However, this type of movement also has a high risk of breakage.

In fact, in the case of horizontal frames, the weight of the slab-shaped articles arranged one on top of the other weighs down on the lower slab-shaped article, which may be broken or deformed as a result of this mechanical stress. The presence of any flakes of material determines a non-linear and uneven distribution of the load that can cause the unbalance of the relevant stack and the fall of the slab-shaped articles that make it up, especially during the movement operations.

In the case of vertical frames, on the other hand, the slab-shaped articles are often unstable, so that the displacement of the frame itself can cause the slab-shaped articles to overturn or fall.

It follows, therefore, that the movement of the slab-shaped articles is today particularly delicate and, in addition to involving a high risk of breakage of the articles themselves, it requires a considerable amount of time that reduces, consequently, the yield of the production line.

The storage methods of the slab-shaped articles used today, in which the storage areas are often far from the production line, and the frames described above also require large work spaces.

DESCRIPTION OF THE INVENTION

The main aim of the present invention is to devise a piece of equipment for the logistics of slab-shaped articles that allows the slab-shaped articles to be moved easily and safely, in order to limit the risk of breakage or damage to the articles themselves.

Within this aim, one object of the present invention is to speed up the movement of the slab-shaped articles, in order to increase the production output of the relevant plant.

Another object of the present invention is to devise a piece of equipment for the logistics of slab-shaped articles which allows reducing the work spaces and areas required for carrying out movement and storage operations.

Another object of the present invention is to devise a piece of equipment for the logistics of slab-shaped articles which allows overcoming the above mentioned drawbacks of the prior art within a simple, rational, easy, effective to use and low cost solution.

The aforementioned objects are achieved by the present equipment for the logistics of slab-shaped articles having the characteristics of claim 1.

The objects set out above are also achieved by the process for the logistics of slab-shaped articles according to the claimed invention.

BRIEF DESCRIPTION OF THE DRAWINGS

Other characteristics and advantages of the present invention will be more evident from the description of some preferred, but not exclusive, embodiments of a piece of equipment for the logistics of slab-shaped articles, illustrated by way of an indicative, yet non-limiting example, in the attached tables of drawings in which.

EMBODIMENTS OF THE INVENTION

Figure 1:
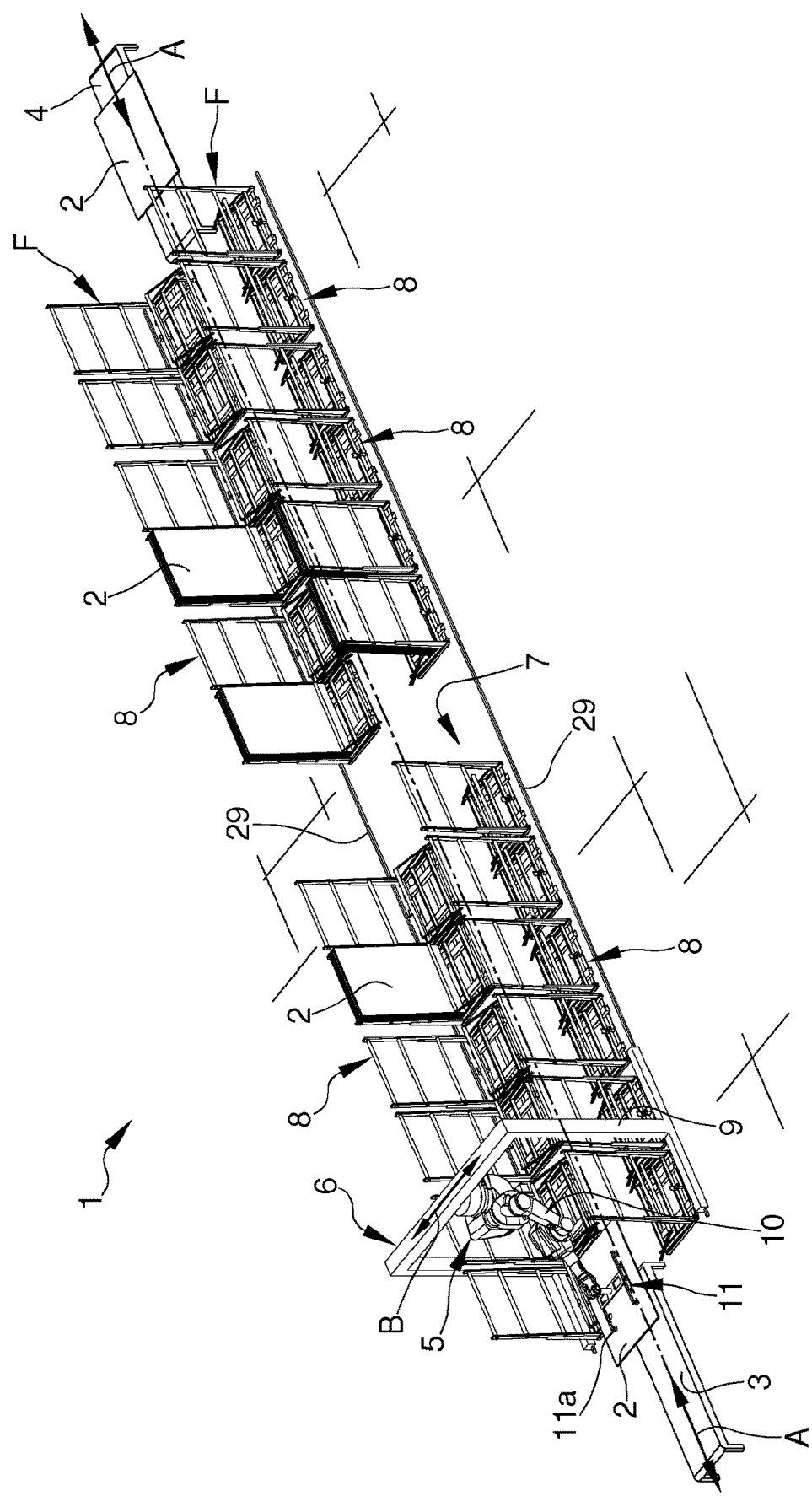
FIG. 1 is an axonometric view of a piece of equipment according to the invention in a first embodiment.

With particular reference to these figures, reference numeral 1 globally indicates a piece of equipment for the logistics of slab-shaped articles, wherein the term "logistics" is used to relate to all the movement and storage operations of the manufactured articles themselves.

In the different embodiments shown in the figures, the components performing the same functions are identified with the same reference numerals.

The equipment 1 is used to move at least one slab-shaped article 2.

The slab-shaped article 2 is a solid body having two dimensions prevailing with respect to the third, thickness, and comprising two substantially flat faces opposite each other.

For example, in the field of the ceramic industry, the slab-shaped articles 2 may have dimensions such that one or more sides can be up to three meters long.

The equipment 1 comprises at least one supply line 3 and at least one outlet line 4 of the slab-shaped articles 2.

In particular, the slab-shaped articles 2 arriving from the supply line 3 must be moved or stored depending on the type and then they are picked to be conveyed to the outlet line 4 in order to be packed for marketing or further processed, if necessary.

In the particular embodiments shown in the figures, the supply line 3 and the outlet line 4 are of the type of supporting surfaces on which the slab-shaped articles 2 are positioned or picked by means of appropriate lifting machines (not shown in the figures), such as e.g. forklifts or trans-pallets or mechanical robots. Alternative embodiments cannot however be ruled out wherein the supply line 3 and the outlet line 4 have different conformation and are, e.g., of the type of roller conveyors or conveyor belts.

The equipment 1 comprises:
at least one robotic gripping assembly 5 of the slab-shaped article 2 provided with at least three degrees of freedom and positioned between the supply line 3 and the outlet line 4;
first movement means 6 of the gripping assembly 5 along at least one direction of movement A.

The direction of movement A is substantially horizontal.

According to the invention, the supply line 3 and the outlet line 4 are arranged along the direction of movement A. In particular, the supply line 3 and the outlet line 4 are substantially aligned to each other along the direction of movement A.

The gripping assembly 5, moving according to its own degrees of freedom and according to the direction of movement A, defines a work area 7 which is positioned between the supply line 3 and the outlet line 4.

According to the invention, the equipment 1 comprises a plurality of temporary storage stations 8 of the slab-shaped article 2 arranged laterally to the gripping assembly 5 and substantially (i.e. except for any tolerances in their positioning) aligned to each other to define at least one row F substantially parallel to the direction of movement A.

The gripping assembly 5 is adapted to:
pick the slab-shaped article 2 coming from the supply line 3;
position the slab-shaped article 2 on at least one of the storage stations 8; and
pick the slab-shaped article 2 from at least one of the storage stations 8 and bring it to the outlet line 4.

In particular, thanks to the first movement means 6, the gripping assembly 5 may be brought closer to the supply line 3 and also, being provided with three degrees of freedom, it may be moved along a substantially vertical direction and be rotated to allow the pick-up of an incoming slab-shaped article 2.

Afterwards, the gripping assembly 5 may be brought closer to a storage station 8 to store the just picked slab-shaped article 2 or to pick a previously stored slab-shaped article 2 and move it to the outlet line 4.

Specifically, the row F is arranged at a perimeter edge of the work area 7.

This way, the gripping assembly 5 may easily reach the storage stations 8, which are located in space so that they do not obstruct the displacements of the gripping assembly 5 along the direction of movement A.

Conveniently, the equipment 1 comprises at least two rows F arranged on opposite sides with respect to the gripping assembly 5.

As can be seen from FIGS. 1 to 10, the rows F are arranged substantially parallel and facing each other.

More particularly, the work area 7 is positioned between the rows F.

In the embodiments shown in the figures, there are two rows F and the gripping assembly 5 can easily reach the storage stations 8 located on opposite sides to the work area 7.

Precisely, the gripping assembly 5, once positioned in the proximity of a storage station 8 arranged on a row F, can easily reach the opposite storage station 8 without being further moved along the direction of movement A.

This way it is possible to improve the production output of the equipment 1, thus saving time and energy.

Advantageously, the gripping assembly 5 is of the type of an anthropomorphic robot 10.

More particularly, the first movement means 6 comprise at least one pair of sliding rails 29 extending parallel to the direction of movement A and at least one load-bearing frame 30 associated movable in a sliding manner with the pair of rails 29 and supporting the gripping assembly 5.

In the embodiments shown in FIGS. 1 to 4, the load-bearing frame 30 is of the type of a bridge crane machine 9 and the gripping assembly 5 is associated in suspension with said bridge crane machine 9. In other words, the bridge crane machine 9 has a crossbar that is arranged substantially horizontal and with which the anthropomorphic robot 10 is associated in suspension.

In this embodiment, the rails 29 are arranged outside the work area 7. In particular, the rails 29 are arranged on the opposite side to the work area 7 with respect to at least one row F, preferably with respect to both rows F.

In the embodiments shown in FIGS. 5 to 10, on the other hand, the equipment 1 comprises a supporting surface 31 of the gripping assembly 5 which is locked together with the load-bearing frame 30 along the direction of movement A. In other words, the anthropomorphic robot 10 is positioned on the supporting surface 31 and moves locked together therewith along the direction of movement A.

Conveniently, in this embodiment, at least one of the rails 29 is arranged inside the work area 7. More specifically, in the embodiments shown in FIGS. 5 to 10, the rails 29 are arranged inside the work area 7 and are positioned between the rows F.

This way, the gripping assembly 5 may easily reach the storage stations 8, which are located in space so that they do not obstruct the displacements of the gripping assembly 5 along the direction of movement A.

It cannot however be ruled out that also in the embodiments shown in FIGS. 1 to 4, the rails 29 can be positioned between the rows F inside the work area 7.

Figure 7:
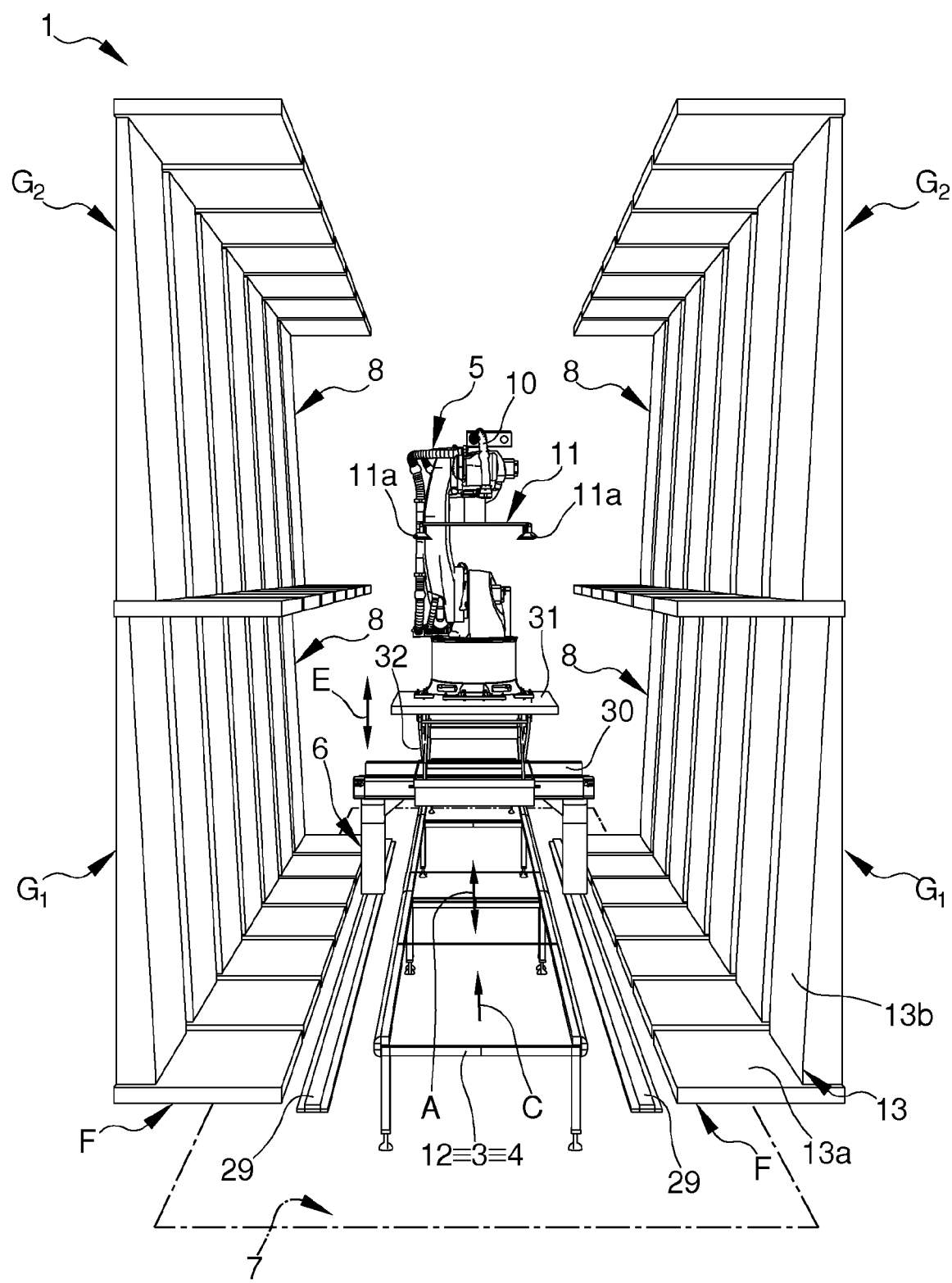
FIGS. 7-9 are perspective views of a fourth embodiment of the equipment for the logistics of slab-shaped articles according to the invention, in different operational phases.
Figure 8:
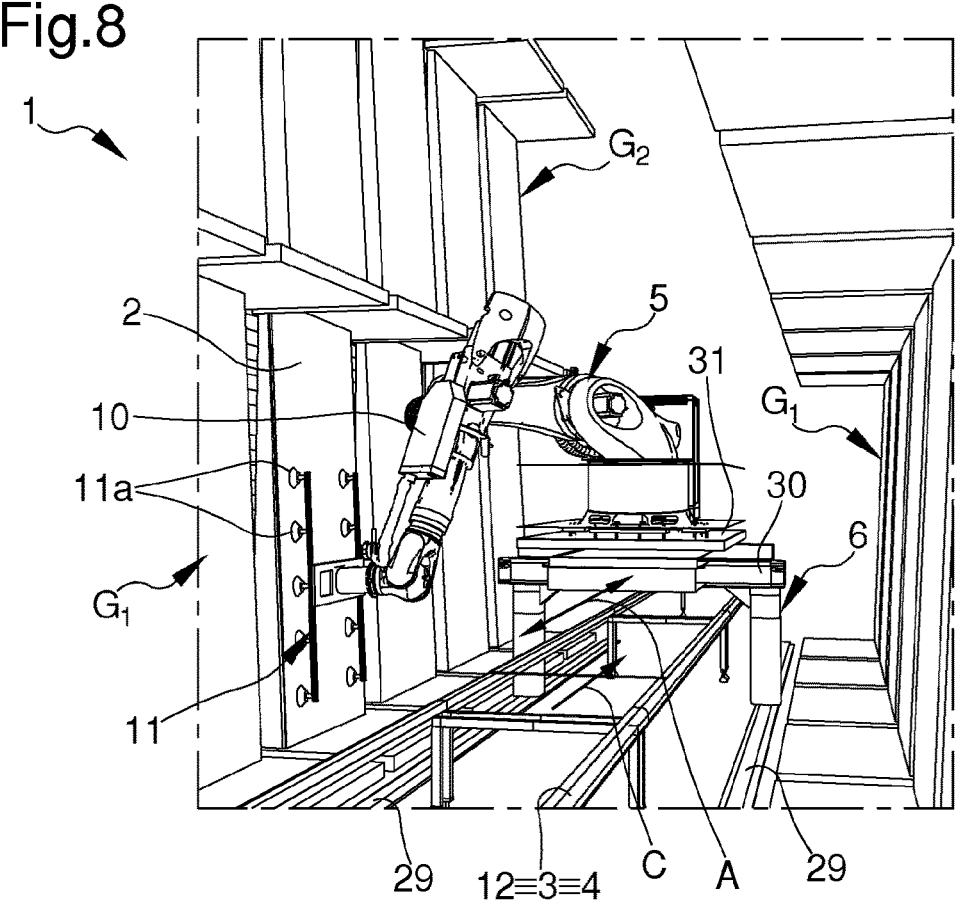
Figure 9:
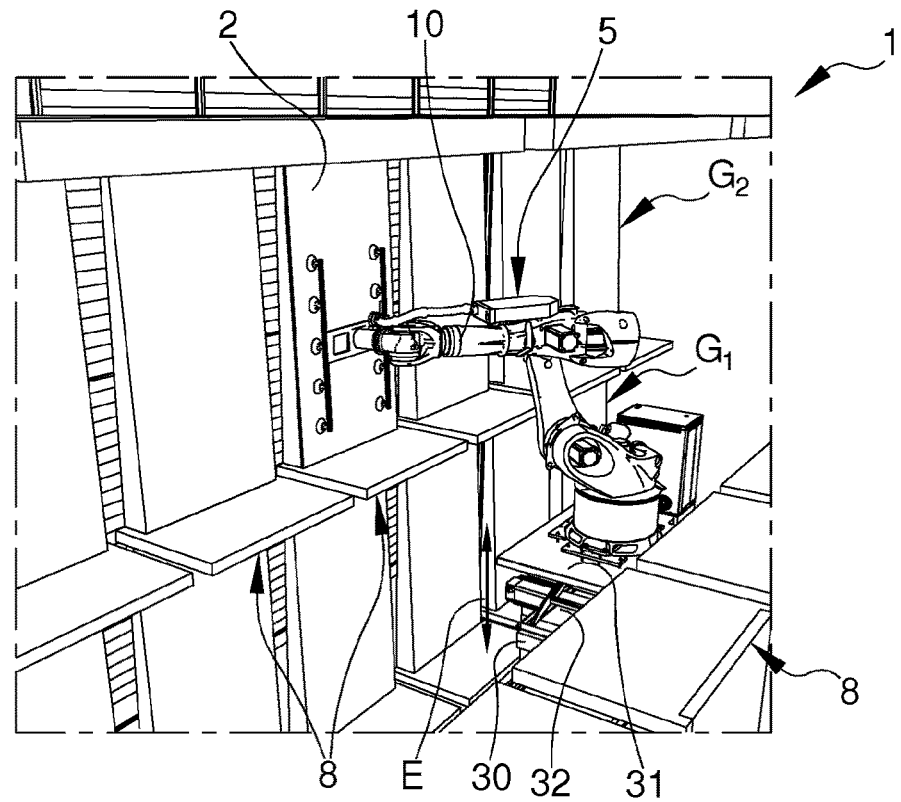

In the embodiment shown in FIGS. 7 to 9, at least one of the rows F comprises at least two groups G1, G2 of storage stations 8 arranged on top of each other.

In other words, the storage stations 8 can be arranged on several levels so that space and production output may be optimized.

In more detail, as shown in FIGS. 7 to 9, a row F is composed of a base group G1 of storage stations 8 anchored onto the ground, and an overhead group G2 wherein each storage station 8 is associated on top with a storage station 8 belonging to the base group G1.

Different embodiments cannot however be ruled out, wherein the row F comprises a plurality of overhead groups G2.

Still with reference to FIGS. 7 to 9, the groups G1, G2 comprise the same number of storage stations 8.

It cannot however be ruled out that the groups G1, G2 comprise a different number of storage stations 8.

Conveniently, the equipment 1 comprises lifting means 32 positioned between the load-bearing frame 30 and the gripping assembly 5 and adapted to move the gripping assembly 5 along at least one substantially vertical direction of elevation E to bring it to each of the groups G.

More particularly, the lifting means 32 are positioned between the supporting surface 31 and the load-bearing frame 30.

The lifting means 32 have the function of lifting the gripping assembly 5 to reach the storage stations 8 located on various levels.

In the embodiment shown in FIGS. 7 to 9, the lifting means 32 comprise at least one scissor lift platform.

It cannot however be ruled out that the lifting means 32 may be of a different type.

Advantageously, the equipment 1 comprises second movement means (not shown in detail in the figures) of the gripping assembly 5 along at least one direction of adjustment B transverse to the direction of movement A.

The direction of adjustment B is substantially horizontal and orthogonal to the direction of movement A.

The second movement means work together with the first movement means 6 to facilitate the approach and/or removal of the gripping assembly 5 to/from the storage stations 8 located on the perimeter edge of the work area 7.

Advantageously, the gripping assembly 5 comprises grasping means 11 of the slab-shaped article 2.

In the particular embodiments shown in the figures, the grasping means 11 are of the suction cup type.

More particularly, the grasping means 11 comprise a plurality of suction cups 11a and at least one vacuum circuit operationally connected to the suction cups 11a.

Alternative embodiments cannot however be ruled out wherein the grasping means 11 have a different conformation and, for example, may be of the type of hooking elements or a gripper.

Advantageously, the grasping means 11 comprise safety means adapted to prevent the slab-shaped article 2 from falling.

Advantageously, the safety means comprise detection means for detecting the absence of vacuum in at least one of the suction cups 11a.

In particular, if one of the suction cups 11a does not adhere perfectly to the slab-shaped article 2, the slab-shaped article 2 may partly or completely detach from the gripping assembly 5 and be damaged.

Thanks to the presence of the detection means for detecting the absence of vacuum, the equipment 1 can be locked, thus avoiding the movement of a slab-shaped article 2 grasped in an unsafe manner.

Alternatively, or in addition, the safety means may be of the mechanical type and comprise, e.g., a clamping element (not shown in the figures) adapted to contact the slab-shaped article 2 in order to hold it after it has been grasped.

This way, in the event of a partial or complete loss of adhesion between the grasping means 11 and the slab-shaped article 2, the clamping element holds the slab-shaped article 2 and prevents it from unbalancing or falling during the movement.

In the embodiments shown in FIGS. 3 to 10, the equipment 1 comprises at least one transport line 12 of the slab-shaped article 2, arranged inside the work area 7 and positioned between the supply line 3 and the outlet line 4.

Conveniently, the transport line 12 is movable along at least one direction of transport C, oriented from the supply line 3 to the outlet line 4, as shown in the figures, in order to move forward the slab-shaped article 2 to the outlet line itself. More in detail, the transport line 12 extends along the direction of movement A. In other words, the direction of transport C is substantially parallel to the direction of movement A. The direction of transport C may also be aligned vertically to the direction of movement A, below it.

Figure 3:
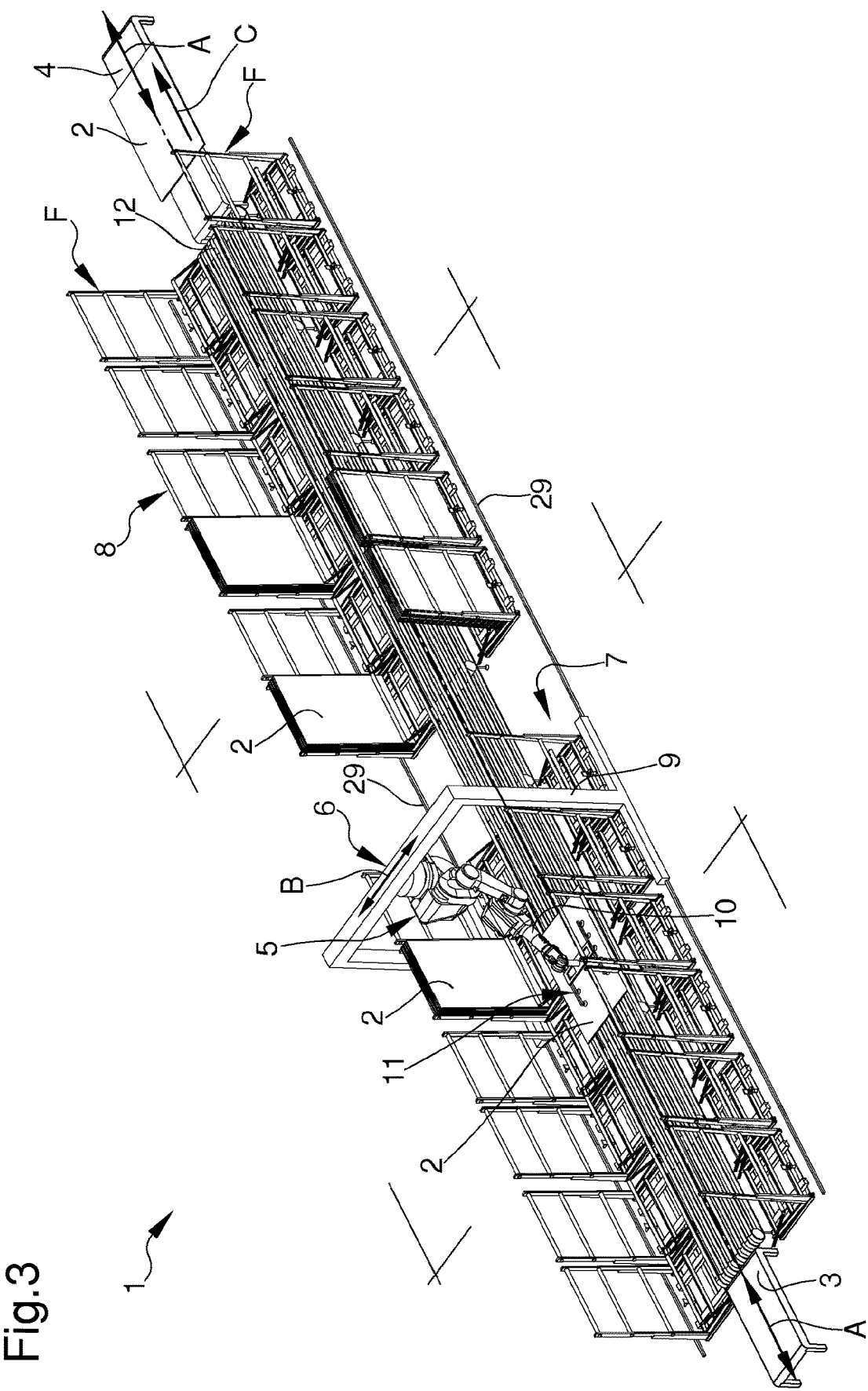
FIG. 3 is an axonometric view of a piece of equipment according to the invention in a second embodiment.
Figure 4:
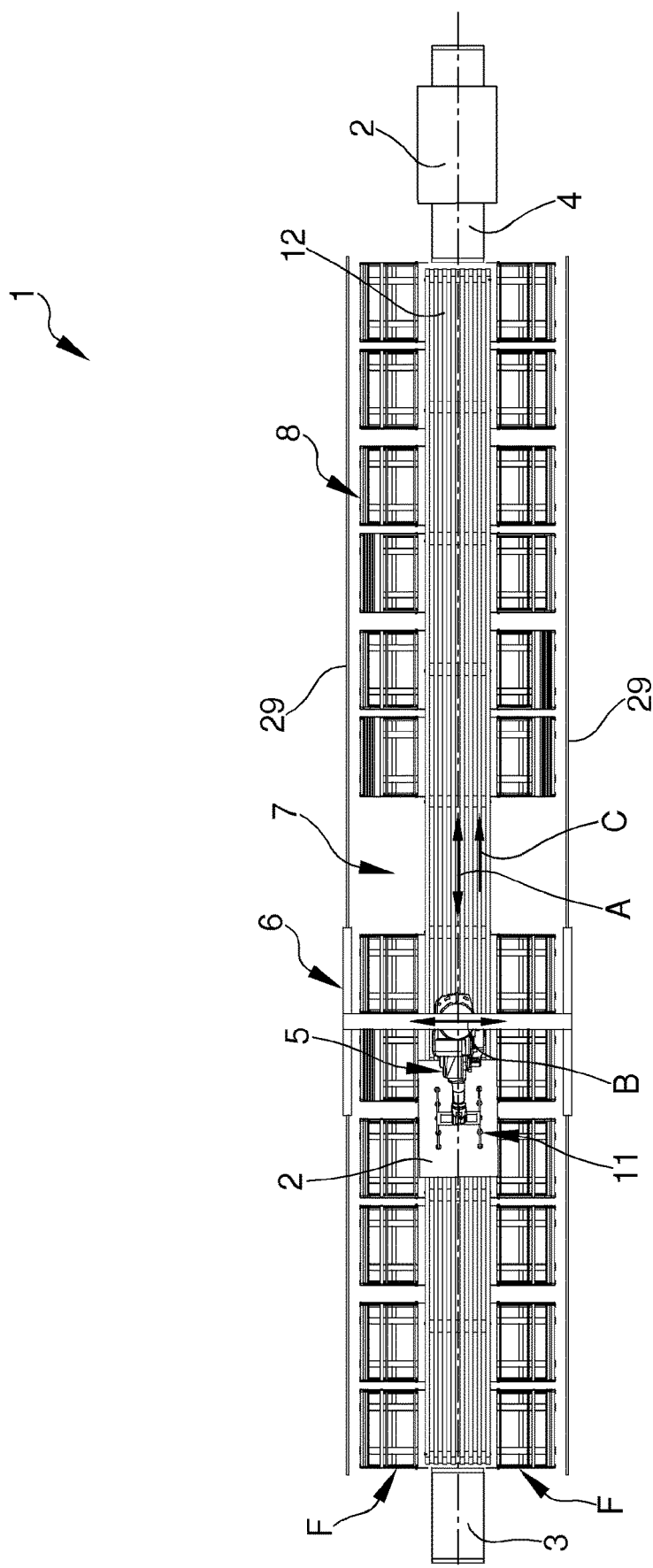
FIG. 4 is a plan view of the equipment in FIG. 3.
Figure 5:
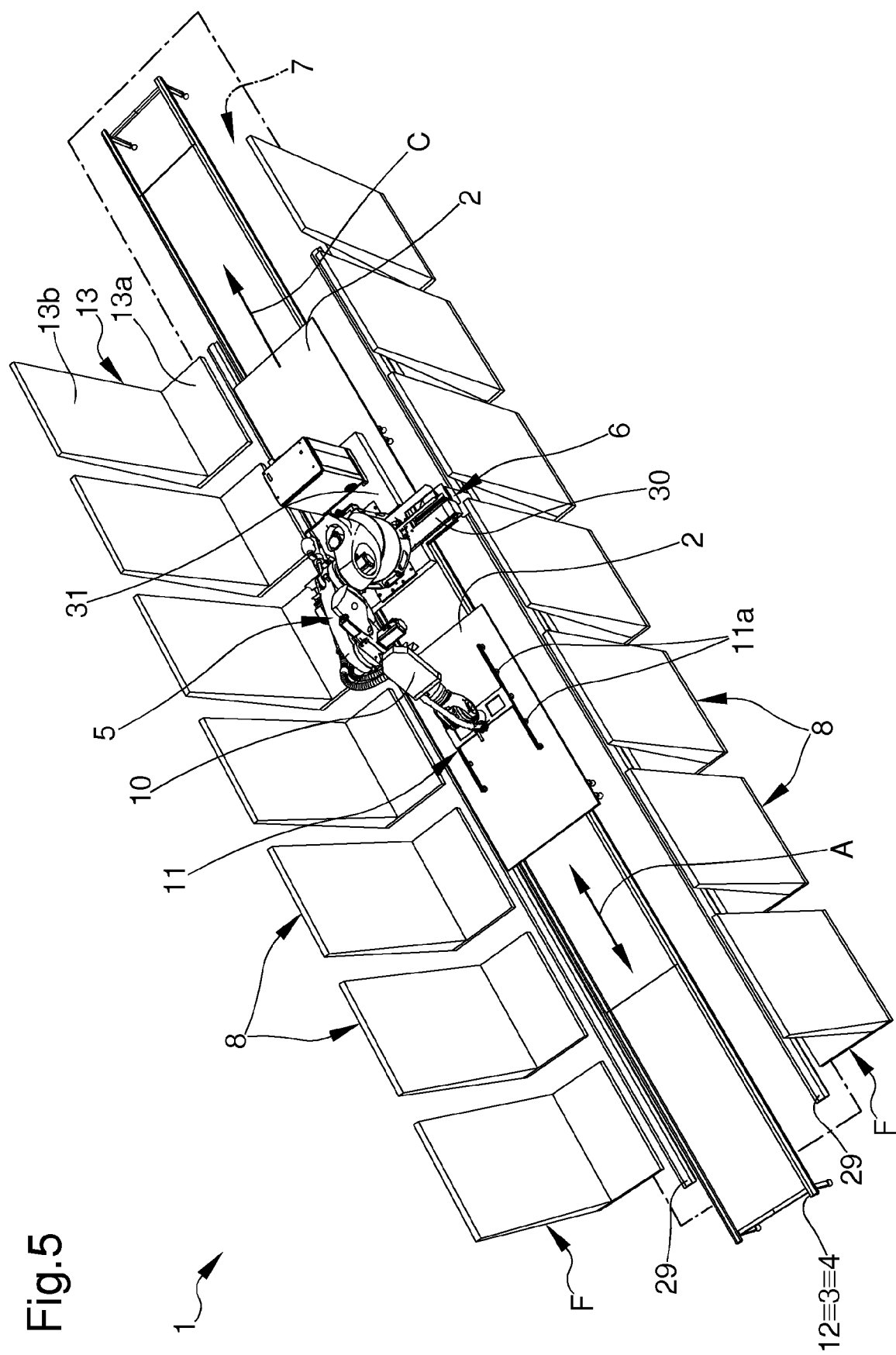
FIGS. 5-6 are perspective views of a third embodiment of the equipment for the logistics of slab-shaped articles according to the invention, in two different operational phases.
Figure 6:
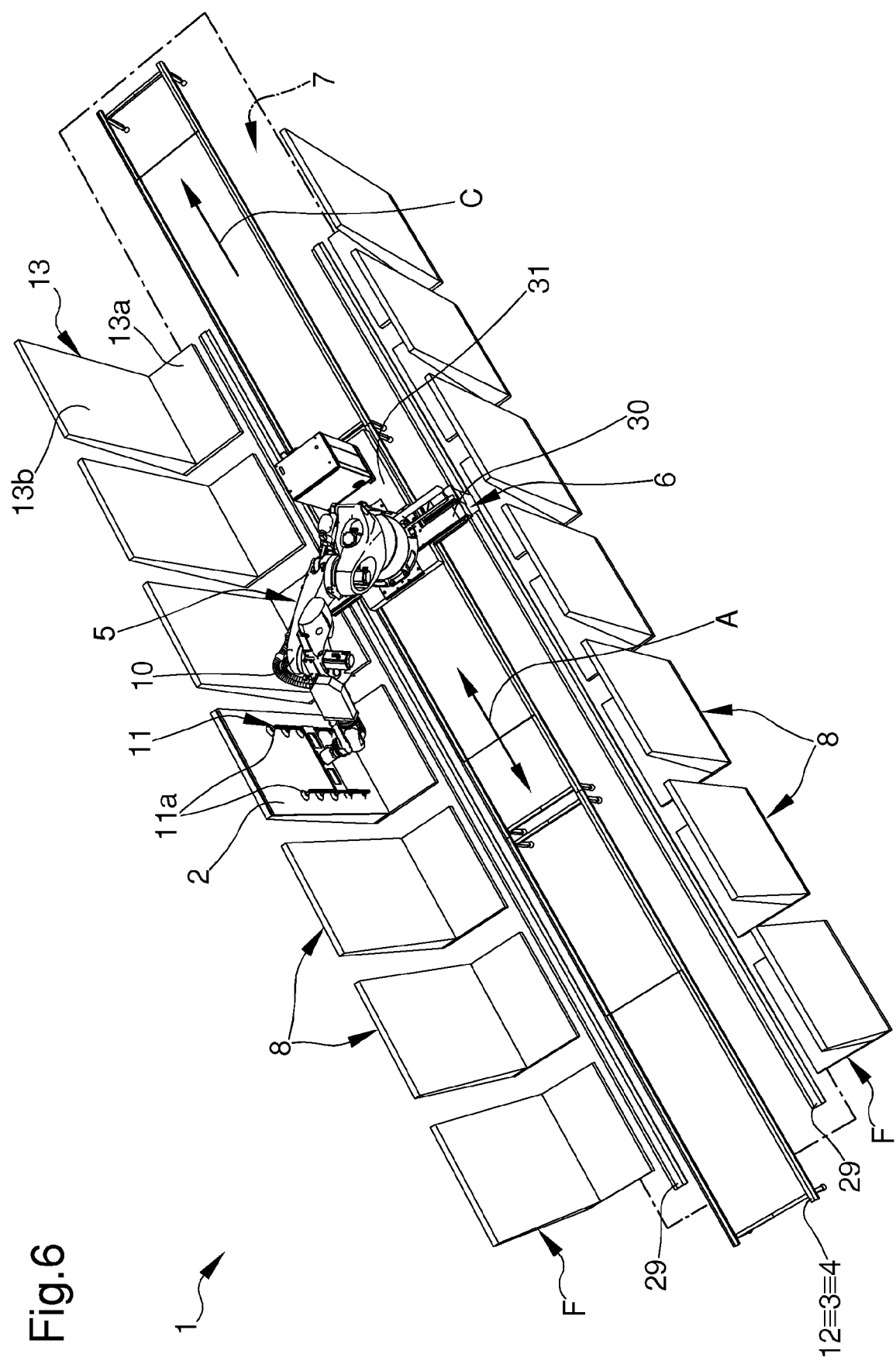

In the particular embodiment shown in FIGS. 3 and 4, the transport line 12 is, e.g., of the type of a conveyor belt or the like.

Conveniently, the transport line 12 is positioned between the rows F.

The slab-shaped article 2, after being positioned on top of the supply line 3, is then moved parallel to the direction of movement A.

The gripping assembly 5 is adapted to pick the slab-shaped article 2 from the transport line 12 to position it on one of the storage stations 8 and to pick the slab-shaped article 2 from one of the storage stations 8 to position it on the transport line 12.

The slab-shaped article 2 coming from the supply line 3 is transferred autonomously, by means of the relevant transfer means, onto the transport line 12, from which it is picked up by means of the gripping assembly 5 to be positioned on a storage station 8.

The gripping assembly 5 is then adapted to pick a slab-shaped article 2 from the storage station 8 and place it on the transport line 12 in order to send it to the outlet line 4.

More specifically, when the slab-shaped article 2, moving along the direction of transport C onto the transport line 12, reaches a loading area, arranged at (i.e. substantially aligned) the storage station 8 on which it has to be positioned, hereinafter referred to as pre-assigned loading storage station 8, the gripping assembly 5 makes a first pick-up of the slab-shaped article 2 and positions it on the pre-assigned loading storage station 8; the gripping assembly 5 then, depending on the requirements, i.e. depending on the type of slab-shaped article 2 needing to be picked, carries out a second pick-up of a slab-shaped article 2 from one of the storage stations 8, hereinafter referred to as pre-assigned unloading storage station 8, and places it on an unloading area of the transport line 12 arranged at the pre-assigned unloading storage station 8.

This way, the displacements of the gripping assembly 5 by the first movement means 6 to the supply line 3 and to the outlet line 4 are reduced thanks to the presence of the transport line 12.

The transport line 12 in fact moves the slab-shaped article 2 until it reaches the relevant storage station 8, where it is picked by the gripping assembly 5.

Similarly, the slab-shaped article 2 to be sent to the outlet line 4 is picked from the relevant storage station 8 by means of the gripping assembly 5, which releases it at the nearest section of the transport line 12.

In the embodiment shown in FIGS. 3 and 4, the transport line 12 is separate from the supply line 3 and from the outlet line 4.

In the embodiment shown in FIGS. 5 to 10, on the other hand, the transport line 12 coincides with the supply line 3 and with the outlet line 4. In this embodiment, the transport line 12, the supply line 3 and the outlet line 4 are made as a single transport line movable along the direction of movement A.

Preferably, the transport line 12 is arranged at a lower height than the load-bearing frame 30 so that it passes thereunder. The load-bearing frame 30 and the transport line 12 are therefore movable one with respect to the other along the direction of movement A and along the direction of transport C, respectively.

More particularly, in the embodiments shown in FIGS. 5 to 10, the transport line 12 is arranged at a lower height than the supporting surface 31.

This way, the gripping assembly 5 is free to move in the direction of movement A even during the transit of the slab-shaped articles 2 on the supply line 3.

This embodiment also allows the transit of the slab-shaped articles 2 to subsequent processing stations without the need to be moved by the gripping assembly 5, with a consequent optimization of the timing.

Figure 10:
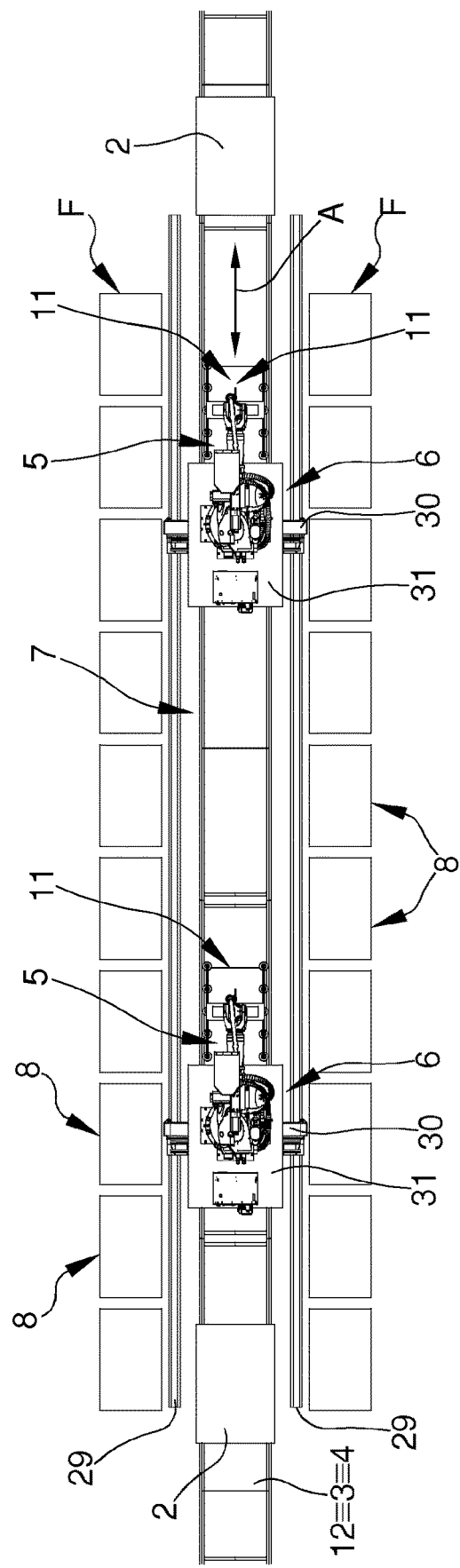
FIG. 10 is a top plan view of a fifth embodiment of the equipment according to the embodiment.
Figure 11:
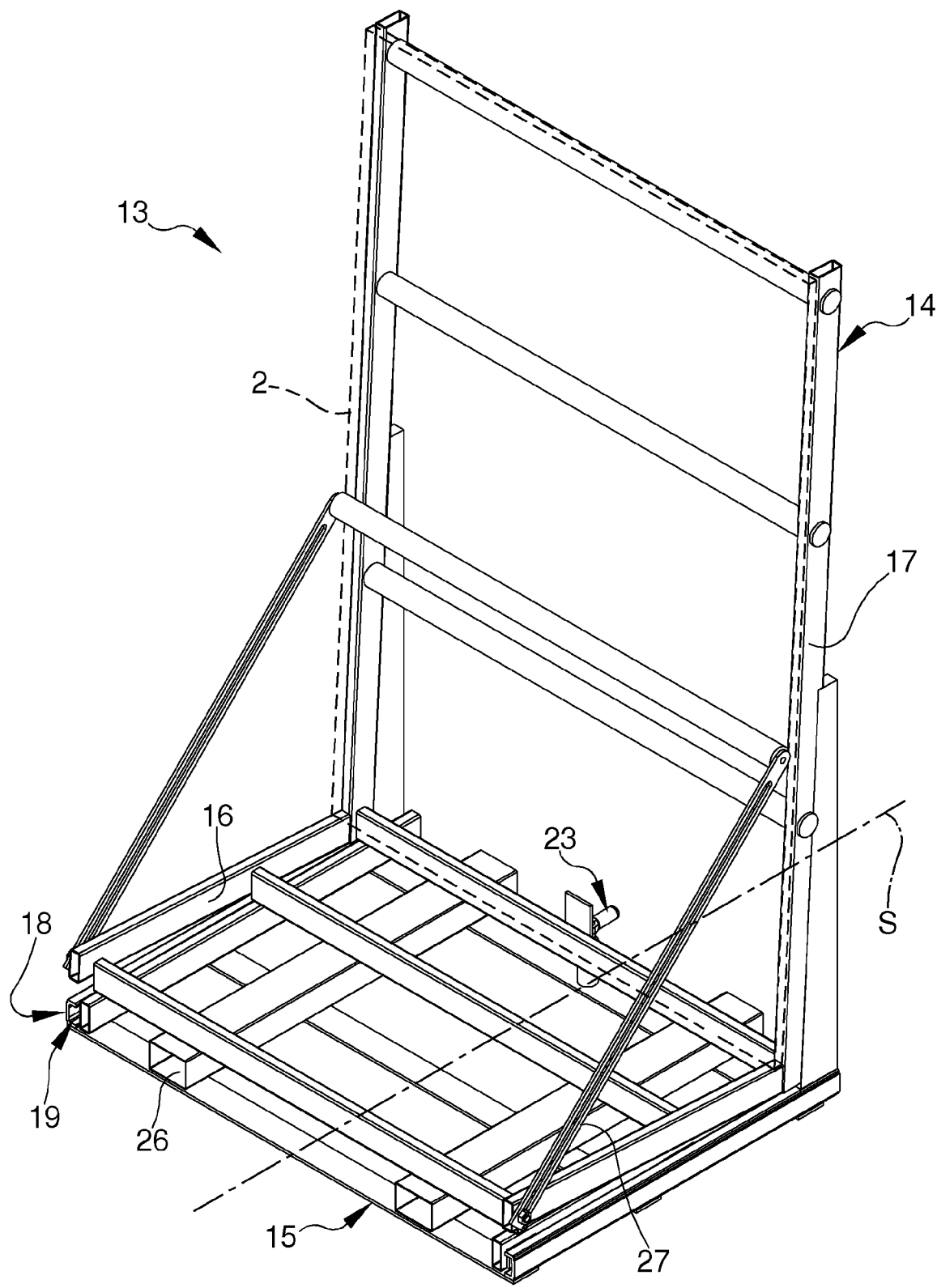
FIG. 11 is an axonometric view of a component of the equipment according to the invention.
Figure 13:
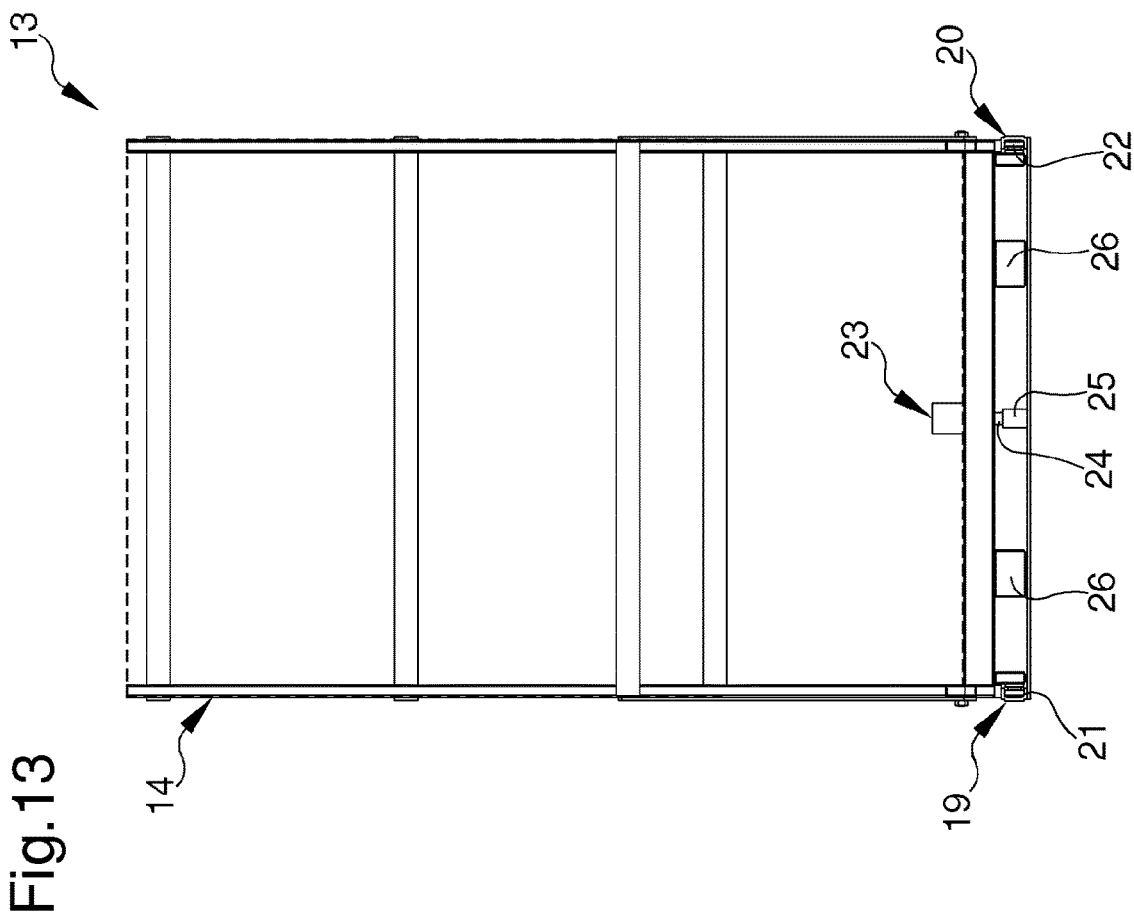
FIG. 13 is a rear elevation view of the component in FIG. 11.
Figure 12:
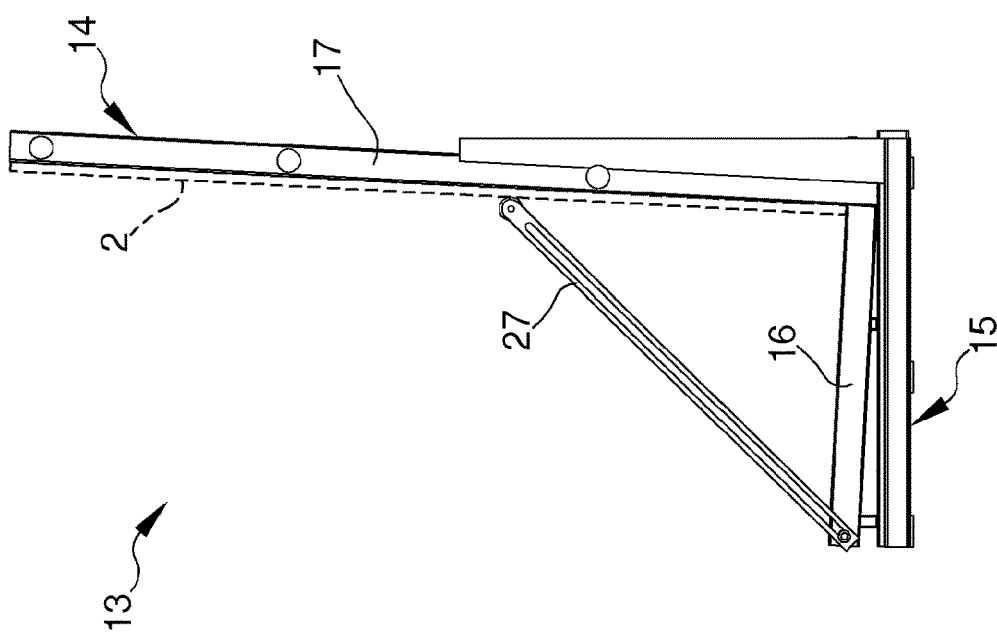
FIG. 12 is a side elevation view of the component in FIG. 11.

In the embodiment shown in FIG. 10, the equipment 1 comprises a plurality of gripping assemblies 5, arranged in succession with each other along the direction of movement A and movable independently of each other along the direction of movement itself. In this embodiment, each gripping assembly 5 is configured both to pick the slab-shaped articles 2 coming from the supply line 3 and position them on a relevant storage station 8 and to pick the slab-shaped articles 2 from a storage station 8 and bring them to the outlet line 4. Conveniently, the equipment 1 also comprises an electronic control unit, not shown in detail in the figures, operationally connected to each gripping assembly 5 and adapted to control the movements and the activities of picking and unloading of the slab-shaped articles 2 by each gripping assembly 5, depending on the types of slab-shaped articles 2 coming from the supply line 3 and on the type of slab-shaped articles 2 required by the outlet line 4, in order to optimize the production output.

Advantageously, each storage station 8 comprises at least one frame 13 for the logistics of the slab-shaped article 2.

For the detailed description of the frame 13 please refer to the application co-deposited by the same applicant and comprised herein by way of reference.

The frame 13 is provided with:
at least one holding frame 14 of one or more slab-shaped articles 2;
at least one fixed frame 15, anchored onto the ground.
The holding frame 14 is provided with:
at least one basic element 16 adapted to receive in support the thickness of the slab-shaped article 2; and
at least one stop element 17 extending transversely to the basic element 16 and adapted to receive in support at least one face of the slab-shaped article 2.

Preferably, the basic element 16 defines a substantially flat base surface and positioned slightly inclined with respect to a horizontal plane and the stop element 17 defines a substantially flat stop surface and positioned slightly inclined with respect to a vertical plane.

Appropriately, the basic element 16 and the stop element 17 are arranged in such a way that the base surface and the stop surface define a substantially right angle between them.

This layout of the basic element 16 and of the stop element 17 means that the slab-shaped article 2, when located resting on the holding frame 14, is arranged slightly inclined with respect to a vertical axis, so as to limit the risk of tipping over and slipping downwards.

Conveniently, the frame 13 comprises removable engagement means 18 of the holding frame 14 to the fixed frame 15.

The engagement means 18 are adapted to allow the sliding of the holding frame 14 with respect to the fixed frame 15 along a substantially horizontal direction of sliding S and to prevent the holding frame 14 from lifting with respect to the fixed frame 15.

Precisely, the holding frame 14 may be alternatively located in a first configuration wherein it is associated in a sliding manner with the fixed frame 15 and in a second configuration wherein it is disengaged from the fixed frame 15.

Conveniently, during the positioning of the slab-shaped article 2 on the holding frame 14 by the gripping assembly 5, the holding frame 14 is engaged with the fixed frame 15.

The holding frame 14, on the other hand, is disengaged from the fixed frame 15 when, e.g., it has to be moved away from the work area 7.

Preferably, the engagement means 18 comprise:
guide means 19 associated with one of the fixed frame 15 and the holding frame 14; and
sliding means 20 associated with the other of the fixed frame 15 and the holding frame 14, wherein the sliding means 20 are engageable in a removable manner with the guide means 19.

In the particular embodiments shown in the figures, the guide means 19 are associated with the fixed frame 15 and the sliding means 20 are associated with the holding frame 14.

Precisely, the guide means 19 comprise at least one pair of guide elements 21 which are substantially C-shaped, so as to define a relevant housing seat extending along the direction of sliding S and arranged side by side.

The sliding means 20 comprise at least one pair of rolling elements 22, e.g. wheels, each of which is insertable inside a relevant housing seat.

Precisely, the rolling elements 22 slide inside the housing seat along the direction of sliding S as a result of the engagement of the holding frame 14 with the fixed frame 15.

At the same time, the upper portion of the housing seat prevents the rolling elements 22 from sliding out of the guide elements 21 by moving upwards.

This way, the holding frame 14 may slide with respect to the fixed frame 15 without being lifted upwards.

The rolling elements 22 slide inside the relevant housing seats until they contact an end stop element, arranged at one extreme portion of each guide element 21.

Conveniently, the frame 13 comprises locking means 23 for locking the holding frame 14 with respect to the fixed frame 15 along the direction of sliding S.

More in detail, the locking means 23 comprise a locking element 24 associated with the holding frame 14 and can be inserted inside an abutment seat 25 associated with the fixed frame 15.

Conveniently, the locking element 24 and the abutment seat 25 are aligned to each other when the holding frame 14 reaches the end stop position defined by the end stop element.

The locking element 24 is movable between a locking position, wherein it is inserted inside the abutment seat 25, and a release position, wherein it is disengaged from the abutment seat 25.

The frame 13 comprises gripping means 26 formed on the holding frame 14 and engageable to allow the lifting and movement of the holding frame 14 when disengaged from the fixed frame 15.

Conveniently, the frame 13 comprises restraining means 27 of the slab-shaped article 2 stored on the holding frame 14.

The restraining means 27 are associated with the holding frame 14 and movable between:
- at least one restraining configuration wherein they face the stop element 17;
- at least one release configuration wherein they are moved away from the stop element 17 with respect to the restraining configuration, so as to allow the positioning/picking of the slab-shaped article 2.

The movement of the restraining means 27 can be carried out manually by an operator or can be carried out automatically.

Precisely, when the gripping assembly 5 deposits or picks the slab-shaped article 2 onto or from the frame 13, the restraining means 27 are positioned in the release configuration so as not to hinder the movement operations of the slab-shaped article 2.

Likewise, as a result of the positioning of the slab-shaped article 2 on the frame 13, the restraining means 27 are positioned in the restraining configuration and are arranged in the proximity or resting on the slab-shaped article 2.

This way, the restraining means 27 are able to avoid the accidental fall of the slab-shaped article 2 from the frame 13.

The operation of the equipment according to the invention is substantially as follows.

The first movement means 6 move the gripping assembly 5 along the direction of movement A and position it alternately in the proximity of the supply line 3, of the outlet line 4 and of the storage stations 8.

In particular, the gripping assembly 5 carries out a first pick-up of the slab-shaped article 2 coming from the supply line 3, the positioning of the slab-shaped article 2 on one of the storage stations 8 and a second pick-up of a slab-shaped article 2, which can be the same as the first pick-up or a different one, from one of the storage stations 8 to bring it to the outlet line 4.

Figure 2:
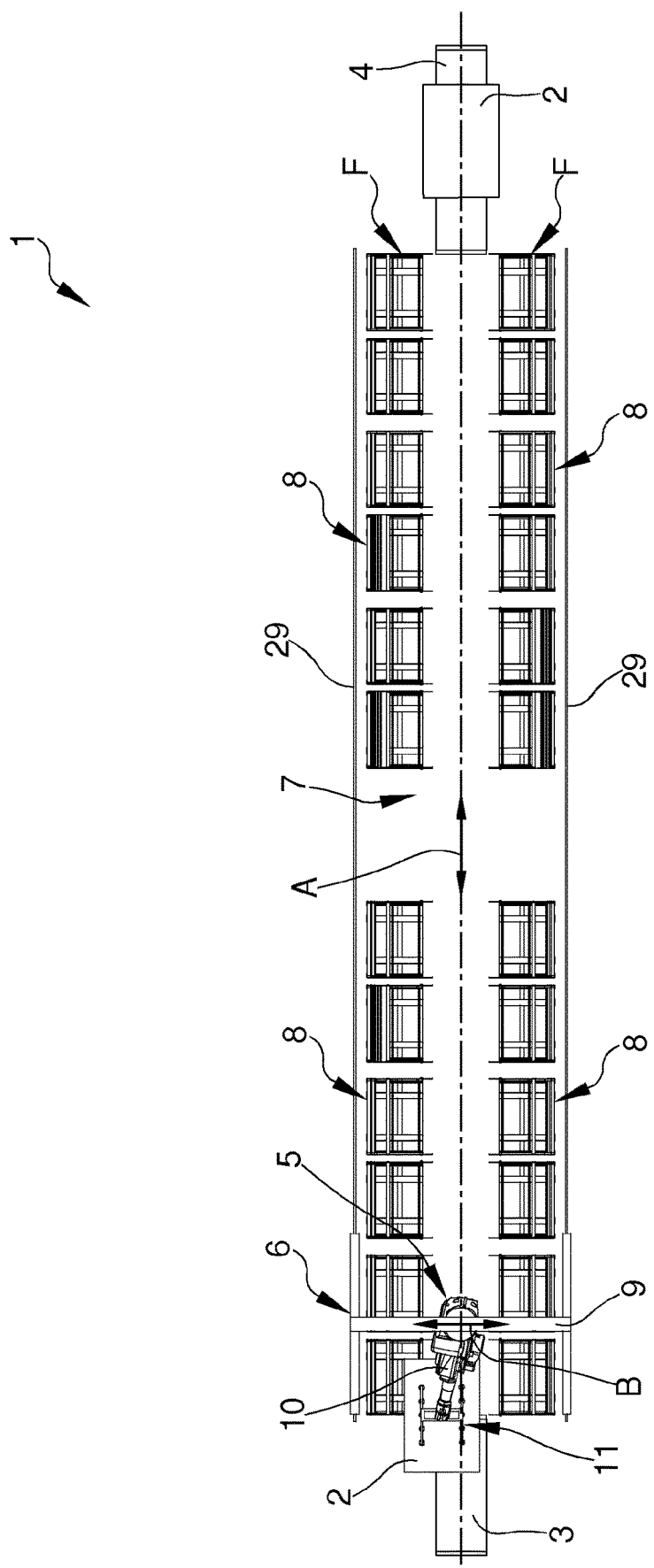
FIG. 2 is a plan view of the equipment in FIG. 1.

In the embodiment shown in FIGS. 1 and 2, the gripping assembly 5 picks up the slab-shaped articles 2 directly from the supply line 3 and places them on the relevant storage stations 8.

The gripping assembly 5, if necessary, picks the slab-shaped articles 2 from the storage stations 8 and places them directly on the outlet line 4.

For this purpose, the restraining means of the storage frame 13 are brought to the release configuration to allow the positioning of the slab-shaped article 2 and then moved to the release configuration to secure the slab-shaped article itself to the storage frame 13.

In the embodiments shown in FIGS. 3 to 10, the transport line 12 moves the slab-shaped articles 2 coming from the supply line 3 at a storage station 8, where they are picked by the gripping assembly 5.

If necessary, the gripping assembly 5 picks the slab-shaped article 2, which has to be sent to the outlet line 4, from the storage station 8 and places it on the transport line 12, which moves it to the outlet line 4.

In these embodiments there is therefore, before the first pick-up, a movement phase of the slab-shaped articles 2 onto the transport line 12 along the direction of transport C.

This movement is carried out until a loading area is reached, which is positioned at a pre-assigned loading storage station 8, after which the gripping assembly 5 positions a slab-shaped article 2 on the pre-assigned loading storage station 8.

The second pick-up is carried out by the gripping assembly 5 by picking a slab-shaped article 2 from a pre-assigned unloading storage station 8, which corresponds to the storage station 8 on which the slab-shaped article 2 to be brought to the outlet line 4 is located, and by positioning the slab-shaped article itself on an unloading area of the transport line 12 located at the pre-assigned unloading storage station 8.

In the embodiment shown in FIGS. 7 to 9, the lifting means 32 move the gripping assembly 5 vertically, along the direction of elevation E, in order to bring it to the desired group G1, G2 of storage stations 8.

It has in practice been ascertained that the described invention achieves the intended objects.

In particular, the fact is emphasized that the equipment allows moving the slab-shaped articles easily, by storing them temporarily on the storage stations on the side of the gripping assembly and picking from time to time from the storage stations only those articles that are required and have therefore to be packaged or shipped for sale.

The presence of a supply line and of an outlet line arranged along the direction of movement of the gripping assembly allows moving the slab-shaped articles according to the logic described above in an extremely fast and safe way, thus limiting to a minimum the number of unnecessary movements and, consequently, also the risk of breakage or damage.

In fact, the slab-shaped articles are arranged at the storage stations that allow the slab-shaped articles to be stored on frames that may be fixed to the ground, if necessary, thus limiting any unbalance of the stored slab-shaped articles.

In addition, the special layout of the storage stations along rows arranged outside the work area of the gripping assembly allows moving the slab-shaped articles in a quick and functional manner, without the presence of obstacles in the work area itself. Last but not least, the special layout of the storage stations in groups arranged on several levels, allows optimizing spaces and production output of logistics.

The invention claimed is:

1. An equipment for a logistics of slab-shaped articles, the equipment comprising:
   at least one supply line of at least one slab-shaped article and at least one outlet line of said at least one slab-shaped article;
   at least one robotic gripping assembly of said at least one slab-shaped article provided with at least three degrees of freedom and positioned between said at least one supply line and said at least one outlet line;
   first movement means of said at least one robotic gripping assembly along at least one direction of movement, so as to define at least one work area of said at least one robotic gripping assembly, wherein
   said at least one supply line and said at least one outlet line are substantially aligned to each other along said at least one direction of movement; and
   a plurality of temporary storage stations of said at least one slab-shaped article arranged laterally to said at least one robotic gripping assembly and substantially aligned to each other to define at least one row substantially parallel to said at least one direction of movement, wherein said at least one robotic gripping assembly is configured to:
picking said at least one slab-shaped article coming from said at least one supply line,
positioning said at least one slab-shaped article on at least one of said storage stations, and
picking said at least one slab-shaped article from at least one of said plurality of temporary storage stations and bring said at least one slab-shaped article to said at least one outlet line,
wherein said first movement means comprise at least one pair of sliding rails extending parallel to said direction of movement and at least one load-bearing frame associated movable in a sliding manner with said pair of rails and supporting said gripping assembly;
at least one supporting surface of said gripping assembly which is locked together with said load-bearing frame at least along said direction of movement,
wherein at least one of said rows comprises at least two groups of said storage stations arranged on top of each other;
at least one transport line of said slab-shaped article arranged inside said work area and positioned between said supply line and said outlet line,
wherein said transport line is movable along a direction of transport, substantially parallel to said direction of movement, said gripping assembly picking said slab-shaped article from said transport line, during forward movement of said transport line along said direction of transport, at one of said storage stations, positioning said slab-shaped article on said storage stations and picking a slab-shaped article from one of said storage stations and releasing said slab-shaped article on said transport line at the storage station from which said slab-shaped article has been picked,
wherein said transport line is substantially aligned to said supply line and to said outlet line, and
wherein said transport line is arranged at a lower height than said load-bearing frame so that said transport line passes thereunder, said load-bearing frame and said transport line being movable one with respect to the other along said direction of transport and along said direction of movement, respectively.

2. The equipment according to claim 1, further comprising:
at least two of said rows arranged opposite with respect to said gripping assembly, said work area being positioned between said rows.

3. The equipment according to claim 2, wherein
said rails are arranged inside said work area and are positioned between said rows.

4. The equipment according to claim 1, further comprising:
lifting means positioned between said load-bearing frame and said gripping assembly and adapted to move said gripping assembly along at least one substantially vertical direction of elevation to bring said gripping assembly to each of said groups.

5. The equipment according to claim 1, further comprising:
at least one supporting surface of said gripping assembly which is locked together with said load-bearing frame at least along said direction of movement, and
said transport line is arranged at a lower height than said supporting surface.

6. The equipment according to claim 1, further comprising:
a plurality of said gripping assemblies, arranged in succession with each other along said direction of movement and movable along the direction of movement itself independently of each other.

7. The equipment according to claim 1, wherein
said gripping assembly comprises grasping means of said slab-shaped article.

8. The equipment according to claim 7, wherein
said grasping means comprise safety means adapted to prevent said slab-shaped article from falling.

9. The equipment according to claim 8, wherein:
said grasping means comprise a plurality of suction cups and at least one vacuum circuit operationally connected to said suction cups; and
said safety means comprise detection means for detecting the absence of vacuum in at least one of said suction cups.

10. The equipment according to claim 1, wherein
said storage station comprises at least one frame comprising:
at least one holding frame of said slab-shaped article and comprising:
at least one basic element adapted to receive in support the thickness of said slab-shaped article; and
at least one stop element extending transversely to said basic element and adapted to receive in support at least one face of said slab-shaped article;
at least one fixed frame, anchored onto the ground;
removable engagement means of said holding frame to said fixed frame, wherein
said engagement means are adapted to allow the sliding of said holding frame with respect to said fixed frame along a substantially horizontal direction of sliding and to prevent said holding frame from lifting with respect to said fixed frame.

11. The equipment according to claim 10, wherein
said frame comprises at least one restraining arm of said slab-shaped article stored on said holding frame, said at least one restraining arm being associated with said holding frame and movable between:
at least one restraining configuration wherein said at least one restraining configuration face said stop element;
at least one release configuration wherein said at least one release configuration are moved away from said stop element with respect to said restraining configuration, so as to allow the positioning/picking of said slab-shaped article.

12. A process for a logistics of slab-shaped articles, said process comprising:
providing a piece of equipment for the logistics of slab-shaped articles, wherein said piece of equipment including:
at least one supply line of at least one slab-shaped article and at least one outlet line of said slab-shaped article;
at least one robotic gripping assembly of said slab-shaped article provided with at least three degrees of freedom and positioned between said supply line and said outlet line;
first movement means of said gripping assembly along at least one direction of movement, so as to define at least one work area of said gripping assembly; said supply line and said outlet line being substantially aligned to each other along said direction of movement;
a plurality of temporary storage stations of said slab-shaped articles arranged laterally to said gripping assembly and substantially aligned to each other to define at least one row substantially parallel to said direction of movement;

first pick-up of said slab-shaped article coming from said supply line by said gripping assembly;

positioning of said slab-shaped article on at least one of said storage stations; and second pick-up of said slab-shaped article from at least one of said storage stations to bring said slab-shaped article to said outlet line, wherein said first movement means comprise at least one pair of sliding rails extending parallel to said direction of movement and at least one load-bearing frame associated movable in a sliding manner with said pair of rails and supporting said gripping assembly;

at least one supporting surface of said gripping assembly which is locked together with said load-bearing frame at least along said direction of movement, wherein at least one of said rows comprises at least two groups of said storage stations arranged on top of each other;

at least one transport line of said slab-shaped article arranged inside said work area and positioned between said supply line and said outlet line, wherein said transport line is movable along a direction of transport, substantially parallel to said direction of movement, said gripping assembly picking said slab-shaped article from said transport line, during forward movement of said transport line along said direction of transport, at one of said storage stations, positioning said slab-shaped article on said storage stations and picking a slab-shaped article from one of said storage stations and releasing said slab-shaped article on said transport line at the storage station from which said slab-shaped article has been picked, wherein said transport line is substantially aligned to said supply line and to said outlet line, and wherein said transport line is arranged at a lower height than said load-bearing frame so that said transport line passes thereunder, said load-bearing frame and said transport line being movable one with respect to the other along said direction of transport and along said direction of movement, respectively.

13. The process according to claim 12, wherein said equipment comprises said at least one transport line positioned between said supply line and said outlet line and movable along a direction of transport substantially parallel to said direction of movement, and said process further comprises, prior to said first pick-up, a movement phase of said slab-shaped article on said transport line along said direction of transport until reaching a loading area arranged at a pre-assigned loading storage station, said positioning being carried out by positioning said slab-shaped article on said pre-assigned loading storage station, and said second pick-up being carried out by picking a slab-shaped article from a pre-assigned unloading storage station and positioning the slab-shaped article itself on an unloading area of said transport line arranged at said pre-assigned unloading storage station.

\* \* \* \* \*